United States Patent [19]
Allemann et al.

[11] Patent Number: 5,170,560
[45] Date of Patent: Dec. 15, 1992

[54] HAND-HELD NIBBLING MACHINE

[75] Inventors: Marco Allemann, Untervaz; Kurt Schmied, Malans; Hendrik W. Grobler, Seewies, all of Switzerland

[73] Assignee: Trumpf Gruesch AG, Switzerland

[21] Appl. No.: 786,281

[22] Filed: Nov. 1, 1991

[30] Foreign Application Priority Data

Nov. 3, 1990 [DE] Fed. Rep. of Germany ... 9015155[U]

[51] Int. Cl.$^5$ ...................... B26B 15/00; B26D 5/00; B23B 5/22
[52] U.S. Cl. ...................... 30/228; 83/916; 279/19
[58] Field of Search ............... 30/228, 241, 366, 358; 83/916, 698; 279/19, 89, 93, 97

[56] References Cited

U.S. PATENT DOCUMENTS

| | | |
|---|---|---|
| 1,768,219 | 6/1930 | Smith . |
| 2,608,180 | 8/1952 | Curtis ................... 279/19 |
| 2,823,040 | 2/1958 | Fischer ................. 279/19 |
| 2,918,290 | 12/1959 | Werstein ............... 279/19 |
| 3,025,600 | 3/1962 | Leibinger et al. . |
| 3,263,545 | 8/1966 | Leibinger et al. . |
| 3,523,475 | 8/1970 | Leibinger et al. . |
| 3,847,049 | 11/1974 | Bitzel .................. 83/916 |
| 4,012,975 | 3/1977 | LaLone ................ 83/916 |
| 4,312,256 | 1/1982 | Herzog et al. ......... 83/916 |
| 4,384,621 | 5/1983 | Bitzel .................. 83/916 |
| 4,832,546 | 5/1989 | Potemkin . |
| 4,834,596 | 5/1989 | Hollifield et al. . |
| 5,055,080 | 9/1991 | Keller et al. . |

FOREIGN PATENT DOCUMENTS 672857 5/1952 United Kingdom .

OTHER PUBLICATIONS

"Trumpf Nibblers" Brochure #1152/A-Trumpf, Inc.

Primary Examiner—Douglas D. Watts
Assistant Examiner—Paul M. Heyrana, Sr.

[57] ABSTRACT

A hand held nibbling machine has a manipulatable housing with a drive head in which there is a downwardly opening passage. A tool assembly has an upper portion extending into the passage of the drive head, a lower portion for supporting a die, and a neck portion therebetween providing a throat portion between the upper and lower portions and into which a workpiece may extend. The upper portion of the tool assembly is releasably engaged in the passage of the drive head by interengaging surfaces about a portion of the outer surface of the upper portion of the tool assembly and about a portion of the wall of the drive head defining the passage, and these surfaces are disengageable by rotation of the tool assembly within the passage to move the interengaging surfaces out of alignment. A releasable fastener in the drive head is engageable with the upper portion of the tool assembly to secure the tool assembly in a rotated position in which the surfaces are interengaged.

18 Claims, 2 Drawing Sheets

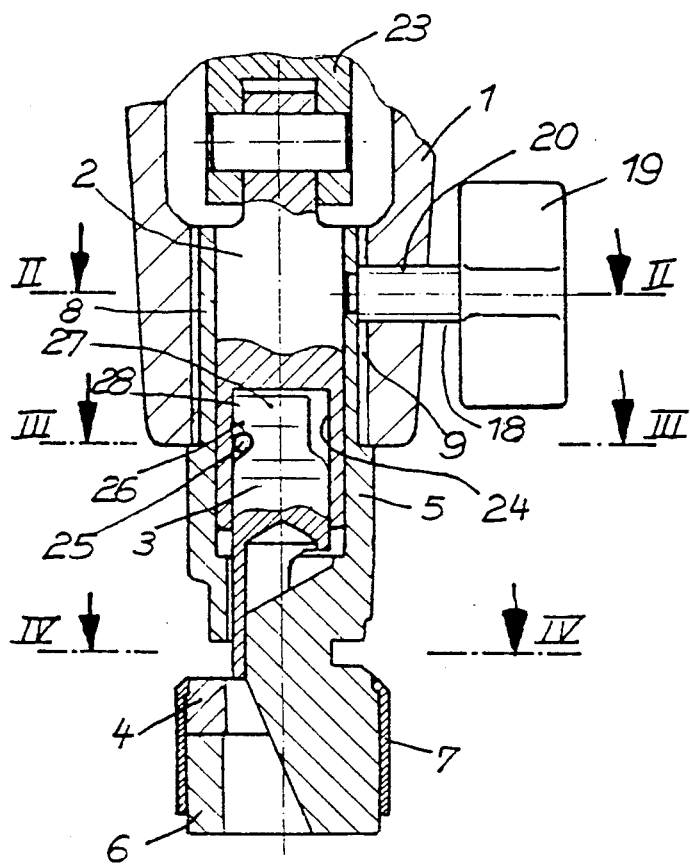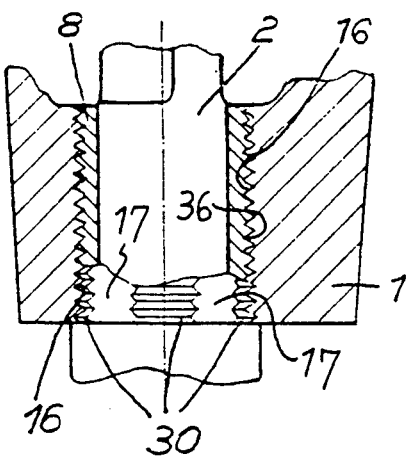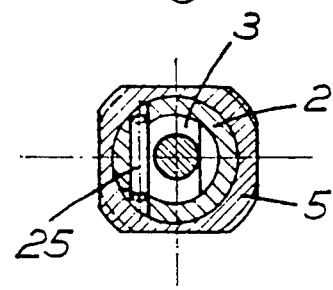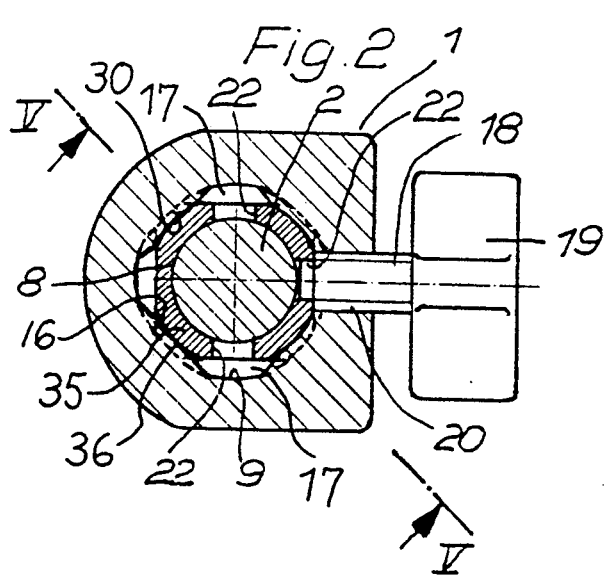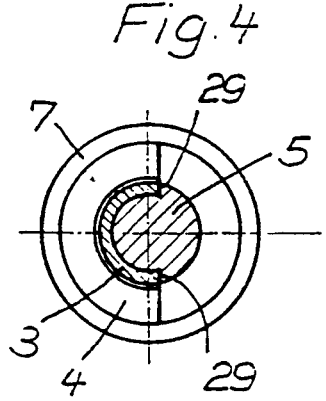

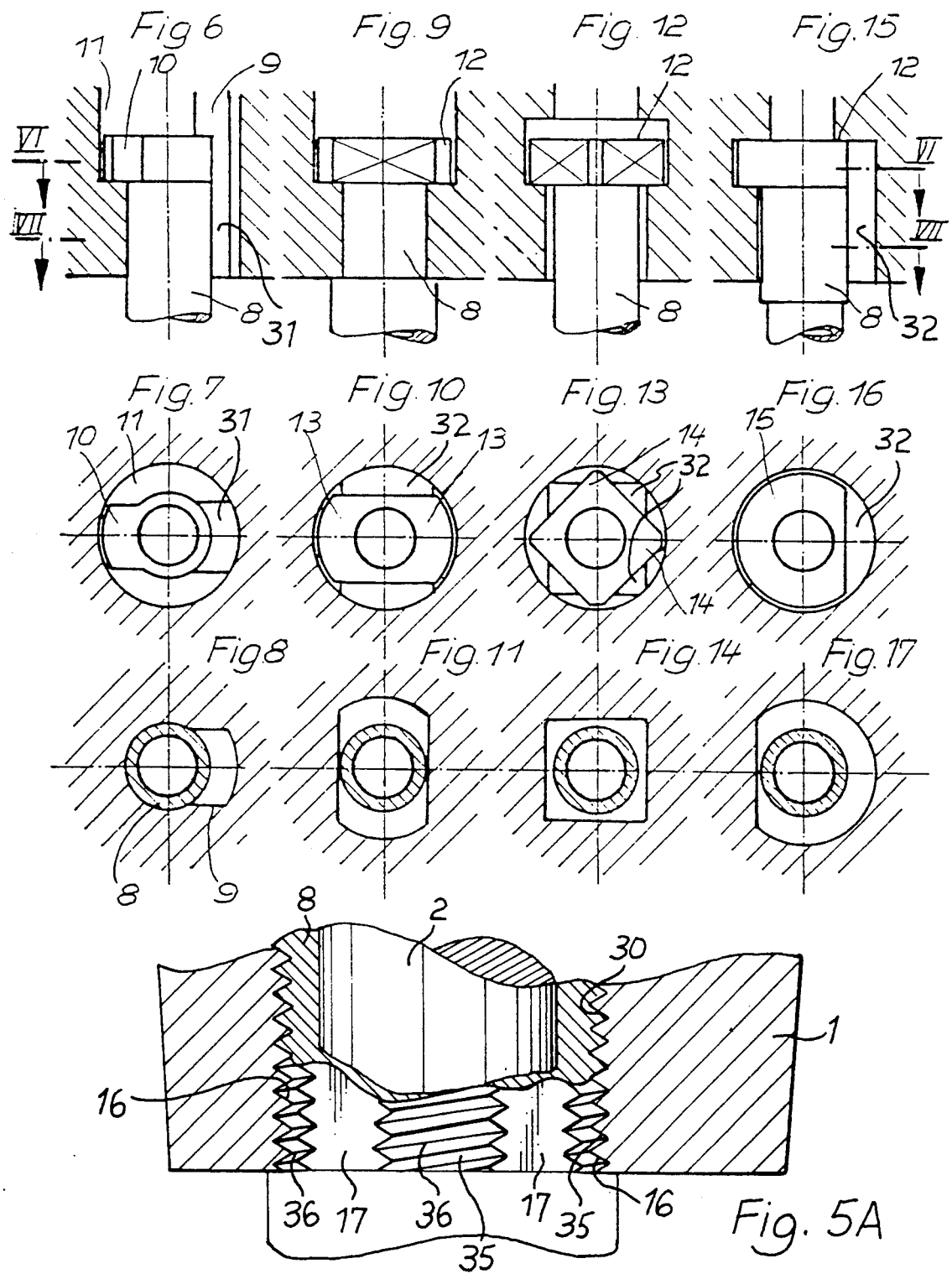

HAND-HELD NIBBLING MACHINE

BACKGROUND OF THE INVENTION

The present invention relates to hand held nibbling machines and, more particularly, to such machines in which the tool mounting assembly is releasably mounted in the drive head.

Hand held nibbling machines are desirably employed for making cutouts in sheet metal and plate workpieces. It is desirable that such hand held nibbling machines utilize a tool mounting assembly carrying the die in spaced position relative to the lower end of the punch and providing a throat therebetween. These tool mounting assemblies must provide a reasonably rigid connection supporting the die and still be readily interchangeable in the drive head.

In Bitzel U.S. Pat. No. 3,847,049, such a hand held nibbling machine has the tool assembly secured in the drive head by threaded pins or the like which extend through openings in the drive head and which are removable to effect disassembly. Various types of connections between such threaded pins and the openings in the drive head are known.

Securing the threaded pin with a cross pin or similar connector has the disadvantage that there is a risk of its breaking under high stress, since all of the forces are channeled through this part into the housing. During nibbling, very high forces occur which put extraordinarily heavy stress on the connecting pieces. As a result, this construction should only be used in machines used to process work pieces which do not require very high nibbling forces. To accommodate greater nibbling forces, the upper end of the tool mounting assembly has been threaded and screwed into a corresponding threaded recess in the drive head. Thus, greater forces can be accommodated in the housing corresponding to the smallest circular cross section of the threaded connection pin.

However, the punch and die are subject to some wear and tear, and they have to be disassembled often to be sharpened or changed. Threading the tool mounting assembly in and out of the drive head is very time consuming. Another disadvantage of this construction is that rotating the tool mounting assembly relative to the drive head to nibble in another direction is possible only at various settings of the cutting edge of the die because of the pitch of the thread.

It is an object of the present invention to provide a novel hand held nibbling machine in which there is optimum transfer of the forces into the drive head and an engagement which enables rapid change of the nibbling tools.

It is also an object to provide such a nibbling machine which may be fabricated readily from durable components.

Another object is to provide such a nibbling machine in which the orientation of the throat relative to the drive head may be readily changed.

SUMMARY OF THE INVENTION

It has now been found that the foregoing and related objects may be readily attained in a hand held nibbling machine in which there is a manipulatable housing having a drive head with a downwardly opening passage therein and a ram reciprocatable in the upper portion of the passage. A tool assembly has its upper portion extending into the passage of the drive head, a lower portion for supporting a die, and a neck portion therebetween providing a throat portion between the upper and lower portions and into which a workpiece may extend.

Releasable means engages the upper portion of the tool assembly in the passage of the drive head, and it is provided by transversely extending interengaging surfaces about a portion of the outer surface of the upper portion of the tool assembly and about a portion of the wall of the drive head defining the passage. These interengaging surfaces are disengageable by rotation of the tool assembly within the passage to move the interengaging surfaces out of alignment. Releasable locking means in the drive head is engageable with the upper portion of the tool assembly to secure the tool assembly in a rotated position interengaging the surfaces.

In the preferred embodiment, a multiplicity of interengaging surfaces are peripherally spaced about the wall of the passage in the head and about the upper portion of the tool assembly, and these interengaging surfaces desirably are peripherally spaced thread segments. Moreover, each area of thread segments optimally comprises a multiplicity of axially spaced thread segments. The thread segments are desirably provided upon peripherally spaced secantally extending surfaces on the wall defining the passage, and the thread segments on the upper portion of the tool assembly are spaced apart by axially extending recesses.

In another embodiment, the interengaging surfaces comprise transversely extending shoulders on one of the passage wall and tool assembly upper portion and a transversely extending collar on the other. The element providing the shoulder has an axially extending surface portion dimensioned for axial movement of the collar therealong to enable the tool assembly to be withdrawn from the passage. Preferably, the collar is provided on the upper portion of the tool assembly, and the shoulder is provided by an inwardly extending boss on the wall of the passage.

In one form, the upper portion of the tool assembly has a transversely elongated cross section providing a pair of diametrically spaced collars and the wall of the passage has a pair of opposed shoulders. As a result, the upper portion may be rotated to dispose the collars between the shoulders to effect axial removal from the passage. In another form, the drive assembly upper portion has a portion of a rectangular cross section providing four collars at its corners, and the passage has a portion with a rectangular cross section providing the shoulders between its corners. The rectangular cross sections are cooperatively dimensioned to permit the drive assembly to be axially withdrawn when the sides of the rectangular surfaces are aligned.

Desirably, the locking means is a fastener seated in an aperture in the drive had of the housing and engageable in a recess in the upper portion of the tool assembly. Preferably, the fastener is threadably engaged in the aperture, and the upper portion has a series of the recesses spaced about its periphery disposed between interengaging surfaces thereof.

BRIEF DESCRIPTION OF THE DRAWINGS

FIG. 1 is a fragmentary sectional view of the lower portion of the drive head of a hand held nibbling machine showing mounted therein a tool assembly in accordance with the present invention;

FIG. 2 is a sectional view along the line II—II of FIG. 1;

FIG. 3 is a sectional view along the line III—III of FIG. 1;

FIG. 4 is a sectional view along the line IV—IV of FIG. 1;

FIG. 5 is a sectional view along the line V—V of FIG. 2;

FIG. 5A is a fragmentary sectional view to an enlarged scale of the interengaged thread segments;

FIG. 6 is a fragmentary sectional view of another embodiment for the engagement tool mounting assembly in accordance with the present invention;

FIG. 7 is a fragmentary sectional view of the embodiment of FIG. 6 along the line VI—VI of FIG. 6;

FIG. 8 is a fragmentary sectional view of the embodiment along the line VII—VII of FIG. 6;

FIG. 9 is a fragmentary sectional view of another embodiment for the engagement of the tool mounting assembly in accordance with the present invention;

FIG. 10 is a fragmentary sectional view along the line VI—VI of FIG. 9;

FIG. 11 is a fragmentary sectional view along the line VII—VII of FIG. 9;

FIG. 12 is a fragmentary sectional view of another embodiment for the engagement of the tool mounting assembly in accordance with the present invention;

FIG. 13 is a fragmentary sectional view along the line VI—VI of FIG. 12;

FIG. 14 is a fragmentary sectional view along the line VII—VII of FIG. 12;

FIG. 15 is a fragmentary sectional view of another embodiment of the engagement of the tool mounting assembly in accordance with the present invention;

FIG. 16 is a fragmentary sectional view along the line VI—VI of FIG. 15; and

FIG. 17 is a fragmentary sectional view along the line VII—VII of FIG. 15.

DETAILED DESCRIPTION OF THE PREFERRED EMBODIMENT

Turning first to FIGS. 1-5, therein illustrated fragmentarily is the lower portion of the drive head of a hand held nibbling machine in which there is mounted a tool assembly in accordance with the present invention. The lower portion of the drive head 1 has a vertically extending passage or bore 9 in which the piston rod 23 reciprocates. Secured to its lower end is the ram 2 which has at its lower end a bore 24 in which is seated the punch 3.

As can be seen, the punch 3 is secured in the bore 24 by a cross pin 25 which is seated in a transversely extending recess 26 in the side surface of the upper portion of the punch 3 and it has its ends seated in aligned apertures in the wall of the ram 2 as is readily observable in the cross section of FIG. 3. The upper end of the punch 3 is of reduced cross section and the recess 26 is in part defined by a transversely extending lip or nose 28 at a point about the periphery of the top of the punch 3. Rotation of the punch 3 in the bore 24 will release the punch 3 from engagement over the pin 25 and allow its axial withdrawal.

As can be seen in FIG. 4, the punch 3 has its side surface configured cooperatively with the adjacent surface of the die support member 5 with its axial edges 29 bearing against cooperating edges of the die support member 5. This guides the punch 3 along the axially extending surface of the die support member 5 and minimizes stress thereon.

Also seated in the bore or passage 9 of the drive head 1 is the upper end 8 of the die support member 5. At the lower end of the member 5 is a die support portion 6, and an interconnecting portion provides a throat into which a workpiece may extend between the lower end of the punch 3 and the die 4 which is carried by the die support portion 6. Extending about the lower portion of the die support 6 is a bushing 7 which serves to retain the die 4 in position therein.

In this embodiment, and as best seen in FIGS. 2 and 5, the periphery of the upper end portion 8 of the die support member 5 has four circumferentially spaced threaded segments 30 thereon with axially extending recesses or notches 22 therebetween. The periphery of the wall defining the bore or passage 9 has four cooperating threaded segments 30 disposed on secantally extending surfaces with unthreaded axial recesses 17 therebetween. The threads 36 on the threaded segments 35 of the upper end portion 8 of the die support member 5 interengage with the threads 16 of the threaded segments 30 in the passage 9 to provide firm engagement therebetween. However, rotation of the die support member 5 will move its threaded segments 35 into the recesses or channels 17 between the threaded segments 30 to enable the die support member to be moved axially within the bore 9.

As seen in FIGS. 1 and 2, the die support member 5 may be locked in engagement against relative rotation in the passage 9 by the set screw 18. It has a threaded shank which threadably seats in the threaded bore 20 of the drive head 1 and which has a conical end 21 which seats in an axial recess or notch 22 in the die support member 5.

Rotation of the set screw 18 is effected by user's gripping of the wing portion 19 with his or her fingers to release it from the notch 22. Because the recesses or notches 22 are disposed at 90° intervals, the die support member 5 may be rotated and secured at any one of the four positions to orient the throat at a desirable position relative to the housing of the tool to act upon the workpiece.

In the embodiment of FIGS. 6-8, the upper end of the die support member 5 has a transversely projecting nose or collar 10 at one point about its periphery, and it seats upon a shoulder provided by a transversely extending recess 11 in the bore or passage 9. When seated in this position, the die support member 5 cannot be axially withdrawn, and forces acting upon the die support member 5 during the nibbling operation are resisted by this interengagement and bearing area. As can be seen in FIGS. 6-8, the passage 9 is configured to provide an axially extending recess or channel 31 so that, if the member 5 is rotated 180° from the position shown in FIGS. 6 and 7, the nose or collar 10 is aligned with the recess 31 to permit axial movement of the die support member 5.

In assembling the die support member 5, it is necessary initially to align the nose 10 with the recess or channel 31 to move the die support member 5 upwardly in the passage 9 and then rotate the member 5 to seat the nose 10 upon the shoulder provided by the recess 11, and thus firmly interengaging the parts.

In FIGS. 9-17, three additional embodiments of the desired nose and shoulder engagement are shown using different configurations for the nose or collar and for the passage. In FIGS. 9-11, the die support member 5 has a pair of diametrically extending nose or collar portions 13 and the passage 9 is configured to provide a recess forming a pair of cooperating shoulders as well as channels 32 to allow the nose portions 13 to move axially therein.

In FIGS. 12-14, the member 5 has a square collar providing four nose portions 14 at its corners, and the passage 9 has a transverse recess of circular configuration to provide four shoulders to seat the nose portions 14. The passage 9 is of rectangular cross section to allow the square collar to move axially therewithin.

In FIGS. 15-17, the member 5 has a collar with a nose portion 15 of truncated circular cross section and the passage 9 has a cooperating transverse recess of circular configuration. The passage 9 has an axially extending configuration which corresponds to that of the nose portion 15.

In each of the several embodiments, the tool mounting assembly or die carrier is readily moved axially within the bore or passage of the drive head to seat it or remove it, and it can be engaged by rotation to effect the cooperating engagement surfaces on its upper end portion in the passage. It can be locked by the set screw in this position securely. The result is a large contact surface which facilitates the transfer of forces from the die to the drive head.

This assembly technique permits disassembly and replacement by the operators hands without any special tools. and the same is true for replacement of the punch.

Thus, it can be seen that the nibbling machine of the present invention is one which is simple in construction, provides good interengagement between the die carrier and the drive head, and permits excellent transfer of the forces. The components of the tool mounting assembly may be readily fabricated, and then may be assembled or disassembled by hand without special tools to provide for facile changing or reorientation of the throat.

Having thus described the invention, what is claimed is:

1. A hand held nibbling machine comprising:
   (a) a manipulatable housing having a drive head with a downwardly opening passage therein and a ram reciprocatable in the upper portion of said passage;
   (b) a tool assembly having an upper portion extending into said passage of said drive head, a lower portion for supporting a die, and a neck portion therebetween providing a throat portion between said upper and lower portions and into which a workpiece may extend;
   (c) releasable means for engaging said upper portion of said tool assembly in said passage of said drive head and comprising transversely extending interengaging surfaces about a portion of the outer surfaces of said upper portion of said tool assembly and about a portion of the wall of said drive head defining said passage, said interengaging surfaces being disengageable by rotation of said tool assembly within said passage to move said interengaging surfaces out of alignment;
   (d) releasable locking means in said drive head engageable with said upper portion of said tool assembly to secure said tool assembly in a rotated position interengaging said surfaces, said locking means being externally manipulatable to secure and release said tool assembly;
   (e) a die removably mounted in said lower portion of said tool assembly; and
   (f) a punch releasably engaged with the lower end of said ram and reciprocatable therewith relative to said die and said tool assembly.

2. The hand held nibbling machine in accordance with claim 1 wherein a multiplicity of said interengaging surfaces are peripherally spaced about said wall of said head and about said upper portion of said tool assembly.

3. A hand held nibbling machine comprising:
   (a) a manipulatable housing having a drive head with a downwardly opening passage therein and a ram reciprocatable in the upper portion of said passage;
   (b) a tool assembly having an upper portion extending into said passage of said drive head, a lower portion for supporting a die, and a neck portion therebetween providing a throat portion between said upper and lower portions and into which a workpiece may extend;
   (c) releasable means for engaging said upper portion of said tool assembly in said passage of said drive head and comprising transversely extending interengaging surfaces about a portion of the outer surface of said upper portion of said tool assembly and about a portion of the wall of said drive head defining said passage, said interengaging surfaces being disengageable by rotation of said tool assembly within said passage to move said interengaging surfaces out of alignment, said upper portion of said tool assembly and said wall of said drive head having a multiplicity of said interengaging surfaces peripherally spaced thereabout, said interengaging surfaces including peripherally spaced thread segments; and
   (d) releasable locking means in said drive head engageable with said upper portion of said tool assembly to secure said tool assembly in a rotated position interengaging said surfaces.

4. The hand held nibbling machine in accordance with claim 3 wherein there are a multiplicity of axially spaced thread segments.

5. The hand held nibbling machine in accordance with claim 4 wherein said thread segments are provided upon peripherally spaced secantally extending surfaces on said wall defining said passage and said thread segments on said upper portion of said tool assembly are spaced apart by axially extending recesses.

6. A hand held nibbling machine comprising:
   (a) a manipulatable housing having a drive head with a downwardly opening passage therein and a ram reciprocatable in the upper portion of said passage, said ram having a bore in its lower end and a punch having its upper end seated in said ram bore, said punch having a transversely extending nose at one point about its periphery adjacent its upper end and said bore having means therein providing a shoulder against which said nose is engageable to retain said punch within said bore, said punch being rotatable to disengage said nose from said shoulder means and to permit axial withdrawal from said bore;
   (b) a tool assembly having an upper portion extending into said passage of said drive head, a lower portion for supporting a die, and a neck portion therebetween providing a throat portion between said upper and lower portions and into which a workpiece may extend;
   (c) releasable means for engaging said upper portion of said tool assembly in said passage of said drive head and comprising transversely extending interengaging surfaces about a portion of the outer surface of said upper portion of said tool assembly and about a portion of the wall of said drive head defining said passage, said interengaging surfaces being disengageable by rotation of said tool assembly within said passage to move said interengaging surfaces out of alignment; and (d) releasable locking means in said drive head engageable with said upper portion of said tool assembly to secure said tool assembly in a rotated position interengaging said surfaces.

7. The hand held nibbling machine in accordance with claim 1 wherein said interengaging surfaces comprise a transversely extending shoulder on said passage wall and a transversely extending nose at the upper end of said tool assembly, said wall of said passage being dimensioned and configured for axial movement of said collar therein to enable said tool assembly to be withdrawn from said passage.

8. The hand held nibbling machine in accordance with claim 7 wherein said upper end of upper portion of said tool assembly has a transversely elongated cross section providing a pair of diametrically spaced nose portions and said wall of said passage is configured to provide a pair of opposed shoulders, whereby said upper end may be rotated to dispose said nose portions between said shoulders to effect its axial removal from said passage.

9. The hand held nibbling machine in accordance with claim 7 wherein the upper end of said tool assembly has a portion of a rectangular cross section providing four collars adjacent its corners and wherein said passage has a rectangular cross section providing said shoulders between the corners thereof, said cross sections being cooperatively dimensioned to permit said drive assembly to be axially withdrawn when the sides of the rectangular surfaces are aligned.

10. The hand held nibbling machine in accordance with claim 1 wherein said locking means is a fastener seated in an aperture in said drive head of said housing and engageable in a recess in said upper portion of said tool assembly.

11. The hand held nibbling machine in accordance with claim 10 wherein said fastener is threadably engaged in said aperture.

12. The hand held nibbling machine in accordance with claim 10 wherein said upper portion has a series of said recesses spaced about its periphery disposed between interengaging surfaces thereof.

13. A hand held nibbling machine comprising:
(a) a manipulatable housing having a drive head with a downwardly opening passage therein and a ram reciprocatable in the upper portion of said passage;
(b) a tool assembly having an upper portion extending into said passage of said drive head, a lower portion for supporting a die, and a neck portion therebetween providing a throat portion between said upper and lower portions and into which a workpiece may extend;
(c) releasable means for engaging said upper portion of said tool assembly in said passage of said drive head and comprising a multiplicity of peripherally spaced transversely extending interengaging surfaces disposed about a portion of the outer surface of said upper portion of said tool assembly and about a portion of the wall of said drive head defining said passage, said upper portion having a series of said recesses spaced about its periphery disposed between said interengaging surfaces thereof, said interengaging surfaces being disengageable by rotation of said tool assembly within said passage to move said interengaging surfaces out of alignment;
(d) a releasable fastener seated in an aperture in said drive head of said housing and engageable in a recess in said upper portion of said tool assembly to secure said tool assembly in a rotated position interengaging said surfaces, said locking means being externally manipulatable to secure and release said tool assembly;
(e) a die removably mounted in said lower portion of said tool assembly; and
(f) a punch releasably engaged with the lower end of said ram and reciprocatable therewith relative to said die and said tool assembly.

14. The hand held nibbling machine in accordance with claim 13 wherein said fastener is threadably engaged in said aperture.

15. A hand held nibbling machine comprising:
(a) a manipulatable housing having a drive head with a downwardly opening passage therein and a ram reciprocatable in the upper portion of said passage;
(b) a tool assembly having an upper portion extending into said passage of said drive head, a lower portion for supporting a die, and a neck portion therebetween providing a throat portion between said upper and lower portions and into which a workpiece may extend;
(c) releasable means for engaging said upper portion of said tool assembly in said passage of said drive head and comprising a multiplicity of peripherally spaced transversely extending interengaging surfaces disposed about a portion of the outer surface of said upper portion of said tool assembly and about a portion of the wall of said drive head defining said passage, said upper portion having a series of said recesses spaced about its periphery disposed between said interengaging surfaces thereof, said interengaging surfaces including peripherally spaced thread segments, said interengaging surfaces being disengageable by rotation of said tool assembly within said passage to move said interengaging surfaces out of alignment; and
(d) a releasable fastener seated in an aperture in said drive head of said housing and engageable in a recess in said upper portion of said tool assembly to secure said tool assembly in a rotated position interengaging said surfaces.

16. The hand held nibbling machine in accordance with claim 15 wherein there are a multiplicity of axially spaced thread segments.

17. A hand held nibbling machine comprising:
(a) a manipulatable housing having a drive head with a downwardly opening passage therein and a ram reciprocatable in the upper portion of said passage;
(b) a tool assembly having an upper portion extending into said passage of said drive head, a lower portion for supporting a die, and a neck portion therebetween providing a throat portion between said upper and lower portions and into which a workpiece may extend;
(c) releasable means for engaging said upper portion of said tool assembly in said passage of said drive head and comprising a multiplicity of peripherally spaced transversely extending interengaging surfaces disposed about a portion of the outer surface of said upper portion of said tool assembly and about a portion of the wall of said drive head defining said passage, said upper portion having a series of said recesses spaced about its periphery disposed between said interengaging surfaces thereof, said interengaging surfaces comprising transversely extending shoulders on inwardly extending bosses on said wall of said passage, and a transversely extending nose at the upper end of said tool assembly, said passage being dimensioned and configured for axial movement of said collars therein to enable said tool assembly to be withdrawn from said passage, said interengaging surfaces being disengageable by rotation of said tool assembly within said passage to move said interengaging surfaces out of alignment; and (d) a releasable fastener seated in an aperture in said drive head of said housing and engageable in a recess in said upper portion of said tool assembly to secure said tool assembly in a rotated position interengaging said surfaces.

18. The hand held nibbling machine in accordance with claim 17 wherein the upper end of said tool assembly has a portion of a rectangular cross section providing four noses adjacent its corners and wherein said passage has a rectangular cross section providing said shoulders between the corners thereof, said cross sections being cooperatively dimensioned to permit said drive assembly to be axially withdrawn when the sides of the rectangular surfaces are aligned.

* * * * *